US012683416B2

(12) United States Patent (10) Patent No.: US 12,683,416 B2
Jang (45) Date of Patent: Jul. 14, 2026

(54) BATTERY PROTECTION CIRCUIT AND PROTECTION METHOD THEREOF

(71) Applicant: LG ENERGY SOLUTION, LTD., Seoul (KR)

(72) Inventor: Ji Uk Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 749 days.

(21) Appl. No.: 17/926,905

(22) PCT Filed: Aug. 20, 2021

(86) PCT No.: PCT/KR2021/011156
§ 371 (c)(1),
(2) Date: Nov. 21, 2022

(87) PCT Pub. No.: WO2022/045687
PCT Pub. Date: Mar. 3, 2022

(65) Prior Publication Data
US 2023/0208162 A1 Jun. 29, 2023

(30) Foreign Application Priority Data

Aug. 31, 2020 (KR) ........................ 10-2020-0110093

(51) Int. Cl.
*H02J 7/00* (2026.01)
*H02J 7/60* (2026.01)
*H02J 7/61* (2026.01)
*H02J 7/62* (2026.01)
(52) U.S. Cl.
CPC ................ *H02J 7/663* (2026.01); *H02J 7/61* (2026.01); *H02J 7/62* (2026.01)

(58) Field of Classification Search
USPC ......................................................... 320/134
See application file for complete search history.

(56) References Cited

U.S. PATENT DOCUMENTS

2003/0122524 A1* 7/2003 Rhee ........................ H02J 9/005
                                                          320/128
2008/0048608 A1  2/2008 Lim et al.
                        (Continued)

FOREIGN PATENT DOCUMENTS

CN       101322295 A    12/2008
CN       110431724 A    11/2018
                (Continued)

OTHER PUBLICATIONS

Extended European Search Report for European Application No. 21861984.9, dated Dec. 20, 2023.
(Continued)

*Primary Examiner* — Samuel Berhanu
(74) *Attorney, Agent, or Firm* — Birch, Stewart, Kolasch & Birch, LLP

(57) ABSTRACT
The present invention relates to a battery protection circuit and a method for protecting the battery protection circuit in which instead of connecting the charge/discharge FET on the current path between the battery and the external system, when an abnormal condition occurs in the battery, the 0V voltage of the battery cell is transmitted to the external system through the disconnection of the voltage sensing line to cut off the abnormal current of the battery in the external system.

10 Claims, 4 Drawing Sheets

(56)  References Cited

U.S. PATENT DOCUMENTS

| | | | |
|---|---|---|---|
| 2008/0309289 A1 | 12/2008 | White et al. | |
| 2012/0206107 A1* | 8/2012 | Ono | H02J 7/00306 |
| | | | 711/E12.001 |
| 2014/0159641 A1 | 6/2014 | Geren | |
| 2014/0253041 A1* | 9/2014 | Takeda | H01M 10/42 |
| | | | 320/134 |
| 2017/0324257 A1 | 11/2017 | Adaniya et al. | |
| 2017/0373514 A1 | 12/2017 | Troberg et al. | |
| 2018/0159314 A1 | 6/2018 | Hayashi et al. | |
| 2019/0293725 A1 | 9/2019 | Tsuchiya et al. | |
| 2019/0319467 A1 | 10/2019 | Kim | |

FOREIGN PATENT DOCUMENTS

| | | | |
|---|---|---|---|
| JP | 7-131938 A | 5/1995 |
| JP | 7-241040 A | 9/1995 |
| JP | 3503887 B2 | 3/2004 |
| JP | 3545367 B2 | 7/2004 |
| JP | 2006-197736 A | 7/2006 |
| JP | 4025580 B2 | 12/2007 |
| JP | 2010-115070 A | 5/2010 |
| JP | 2017-208881 A | 11/2017 |
| JP | 2019-176714 A | 10/2019 |
| KR | 10-0586392 B1 | 6/2006 |
| KR | 10-2008-0017824 A | 2/2008 |
| KR | 10-1967464 B1 | 4/2019 |
| KR | 10-2045999 B1 | 11/2019 |
| WO | WO 2016/063760 A1 | 4/2016 |

OTHER PUBLICATIONS

International Search Report (PCT/ISA/210) issued in PCT/KR2021/011156, dated Dec. 3, 2021.

* cited by examiner

RELATED ART

BATTERY PROTECTION CIRCUIT AND PROTECTION METHOD THEREOF

CROSS REFERENCE TO RELATED APPLICATIONS

This application is the National Phase of PCT/KR2021/011156 filed on Aug. 20, 2021, which claims priority under 35 U.S.C. § 119(a) to Patent Application No. 10-2020-0110093 filed in the Republic of Korea on Aug. 31, 2020, all of which are hereby expressly incorporated by reference into the present application.

TECHNICAL FIELD

The present invention relates to a battery protection circuit and a method for protecting the same, and more particularly, to a battery protection circuit for protecting a battery from overcharge, overdischarge and overcurrent, and a method for protecting the same.

BACKGROUND ART

Batteries are widely used in various fields ranging from small electronic devices such as smart phones, laptops, and tablet PCs to electric vehicles and energy storage systems (ESS).

However, while such a battery has efficiency and convenience that may be used in various fields, it has a risk of ignition when overheated due to a characteristic of high energy density. In addition, in the case of overdischarge, the performance of the battery may be deteriorated, and furthermore, a situation may occur in which safety is impaired.

In order to secure the safety of such a battery, a battery protection circuit that protects the battery from overcharge, overdischarge, overcurrent, and short circuit is used.

On the other hand, in general, as shown in FIG. 1, the battery protection circuit 20 configures the charge/discharge FETs 22*a* and 22*b* on the current path between the battery cell 10 and the output unit 30 to the external system, and uses a method of protecting the battery by blocking the abnormal current by turning off the charge/discharge FETs 22*a* and 22*b* when an abnormality such as overcharge, overdischarge, or overcurrent occurs.

However, the charge/discharge FETs 22*a* and 22*b* configured on the current path must use low-resistance FETs having a small resistance value in order to prevent current loss and heat generated by the current flowing through the current path. However, low-resistance FETs have the disadvantage of being larger and more expensive than general FETs, so that this causes problems such as an increase in price and size of the battery protection circuit, and an increase in internal resistance of the battery.

Related prior art is disclosed below patent document 1.

(Patent Document 1) KR2045999 B1

DISCLOSURE OF THE INVENTION

Technical Problem

An object of the present invention is to provide a battery protection circuit and method for protecting a battery from abnormal situations such as overcharge, overdischarge, and overcurrent by using a general FET.

Technical Solution

A battery protection circuit for protecting a battery cell from abnormal situations including overcharge, overdischarge and overcurrent according to the present invention includes: a current sensing unit connected in series on a current output path formed between one terminal of the battery cell and an output unit to an external system and configured to sense a current of the battery cell flowing in the path; a voltage sensing unit connected to a voltage sensing line connected to both ends of the battery cell to sense a voltage of the battery cell; a voltage information transmission unit configured to transmit the voltage of the battery cell sensed by the voltage sensing unit to the external system; a control unit configured to determine whether an abnormal situation occurs in the battery cell using the current sensed by the current sensing unit and a voltage sensed by the voltage sensing unit, and disconnect the voltage sensing line according to the determination result; and a sensing line blocking FET provided on the voltage sensing line and configured to be turned off under the control of the control unit to disconnect the voltage sensing line.

In detail, the control unit includes: a first determination unit configured to compare whether voltage of the battery cell sensed by the voltage sensing unit is equal to or greater than a predetermined first reference value, and determine that the battery cell is in an overcharge state and output an overcharge signal when the voltage of the battery cell is greater than or equal to the predetermined first reference value; a second determination unit configured to compare whether the voltage of the battery cell sensed by the voltage sensing unit is less than or equal to a predetermined second reference value, determine that the battery cell is in an over-discharge state and output an overdischarge signal when the voltage of the battery cell is less than or equal to the predetermined second reference value; a third determination unit configured to compare whether the current of the battery cell sensed by the current sensing unit is equal to or greater than a predetermined third reference value, and determine that the battery cell is in an overcurrent state and output an overcurrent signal when the current of the battery cell is equal to or greater than the predetermined third reference value; and a blocking FET control unit configured to disconnect the voltage sensing line by turning off the sensing line blocking FET when any one of the overcharge signal, the overdischarge signal and the overcurrent signal is output by a respective one of the first determination unit, the second determination unit and the third determination unit.

Moreover, when the voltage sensing line is disconnected by the blocking FET control unit, the voltage of the battery cell sensed by the voltage sensing unit 0V.

Accordingly, when the voltage information transmission unit transmits the 0V voltage of the battery cell to the external system, the external system senses that the battery cell is in a low voltage state and turns off system power of the external system.

A method of protecting a battery cell from abnormal situations including overcharge, overdischarge and overcurrent includes: a cell state information measurement step of measuring a current and a voltage of the battery cell at predetermined periodic intervals through a sensing resistor provided on a current output path between the battery cell and an output unit to an external system and a voltage sensing line connected to both ends of the battery cell; an abnormal situation occurrence determination step of determining whether an abnormal situation occurs in the battery cell using the current and the voltage of the battery cell measured in the cell state information measurement step; a voltage sensing line disconnection step of disconnecting the voltage sensing line when it is determined that an abnormal situation occurs in the battery cell by the abnormal situation occurrence determination step; a cell voltage information transmission step of transmitting the voltage of the battery cell measured through the voltage sensing line disconnected by the voltage sensing line disconnection step to the external system; and an external system power off step of automatically turning off system power in the external system receiving the voltage of the battery cell measured through the disconnected voltage sensing line through the cell voltage information transmission step.

In detail, the abnormal situation occurrence determination step includes: an overcharge determination step of comparing whether the voltage of the battery cell measured in the cell state information measurement step is equal to or greater than a predetermined first reference value, and determining that the battery cell is in an overcharge state when the voltage of the battery cell is equal to or greater than the predetermined first reference value; an overdischarge determination step of comparing whether the voltage of the battery cell measured in the cell state information measurement step is less than or equal to a predetermined second reference value, and determining that the battery cell is in an overdischarge state when the voltage of the battery cell is less than or equal to the predetermined second reference value; and an overcurrent determination step of comparing whether the current of the battery cell measured in the cell state information measurement step is equal to or greater than a predetermined third reference value, and determining that the battery cell is in an overcurrent state when the current of the battery cell is equal to or greater than the predetermined third reference value, wherein when any one of the overcharge, the overdischarge and the overcurrent is determined, it is determined that an abnormal situation occurs in the battery cell.

Furthermore, the voltage sensing line disconnection step includes turning off a sensing line blocking FET disposed on the voltage sensing line.

Accordingly, in the cell voltage information transmission step, the voltage of the battery cell transmitted to the external system is 0V.

Accordingly, the external system off step senses that the current battery cell is in a low voltage state and turns off the system power when the 0V voltage value of the battery cell is transmitted by the cell voltage information transmission step in the external system.

Moreover, a battery pack includes such a battery protection circuit.

Advantageous Effects

The battery protection circuit of the present invention uses a general FET instead of a low resistance FET to protect the battery from abnormal situations such as overcharge, overdischarge, and overcurrent, thereby reducing the price and size of the battery protection circuit. In addition, there is an effect that the internal resistance of the battery is reduced.

BRIEF DESCRIPTION OF THE DRAWINGS

FIG. 1 is a circuit diagram schematically showing a conventional battery protection circuit.

MODE FOR CARRYING OUT THE INVENTION

Figure 2:
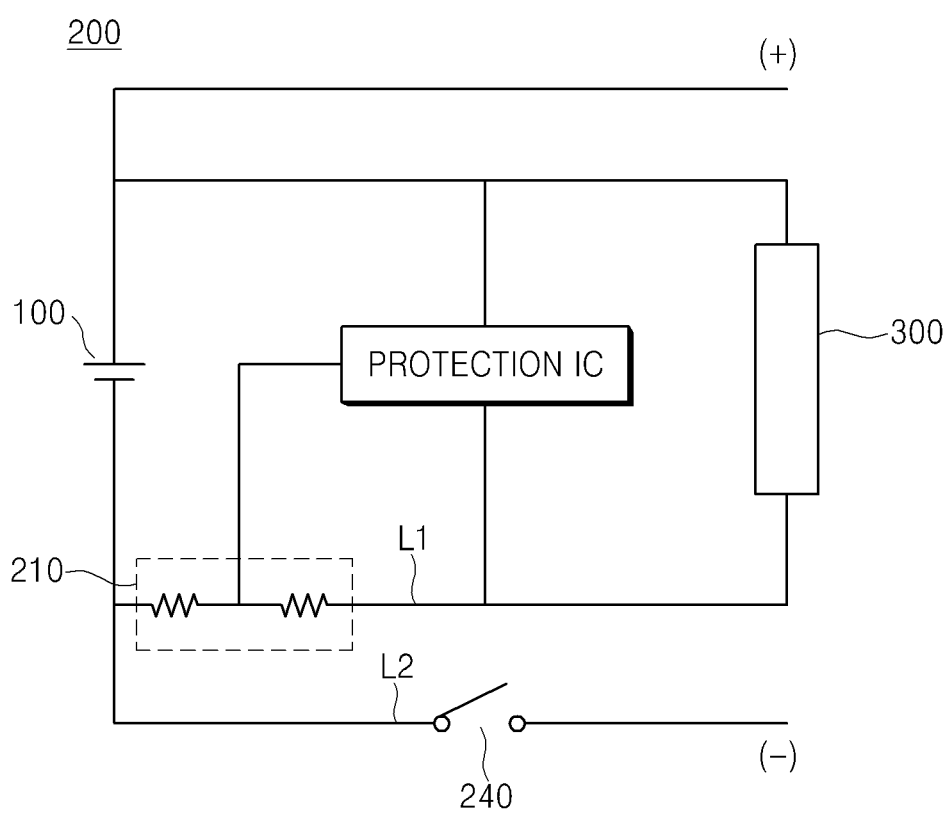
FIG. 2 is a circuit diagram schematically illustrating a battery protection circuit according to the present invention.

Hereinafter, embodiments of the present invention will be described in detail with reference to the accompanying drawings so that those of ordinary skill in the art may easily implement the present invention. However, the present invention may be implemented in various forms and is not limited to the embodiments described herein. In the drawings, parts irrelevant to the description are omitted in order to clearly describe the present invention, and like reference numerals refer to like elements throughout the specification.

Hereinafter, the present invention will be described in detail with reference to the drawings.

1. Battery Protection Circuit According to Present Invention

A battery protection circuit according to the present invention will be described with reference to FIGS. 2 and 3. The battery protection circuit 200 of the present invention is a configuration that protects a battery cell from abnormal situations including overcharge, overdischarge, and overcurrent, and may include the following configuration.

1.1. Current Output Path L1

First, the current output path is formed between one terminal of the battery cell 100 and the output unit 300 to an external system, and is a path through which current flows from the battery cell 100 to the output unit 300, and may supply power to an external system through this path.

Here, the external system refers to an electronic device including, for example, a mobile phone, a laptop computer, a tablet PC, etc., which is a connected to a connector of the battery pack and uses the current from the battery cell 100 as driving power.

Figure 3:
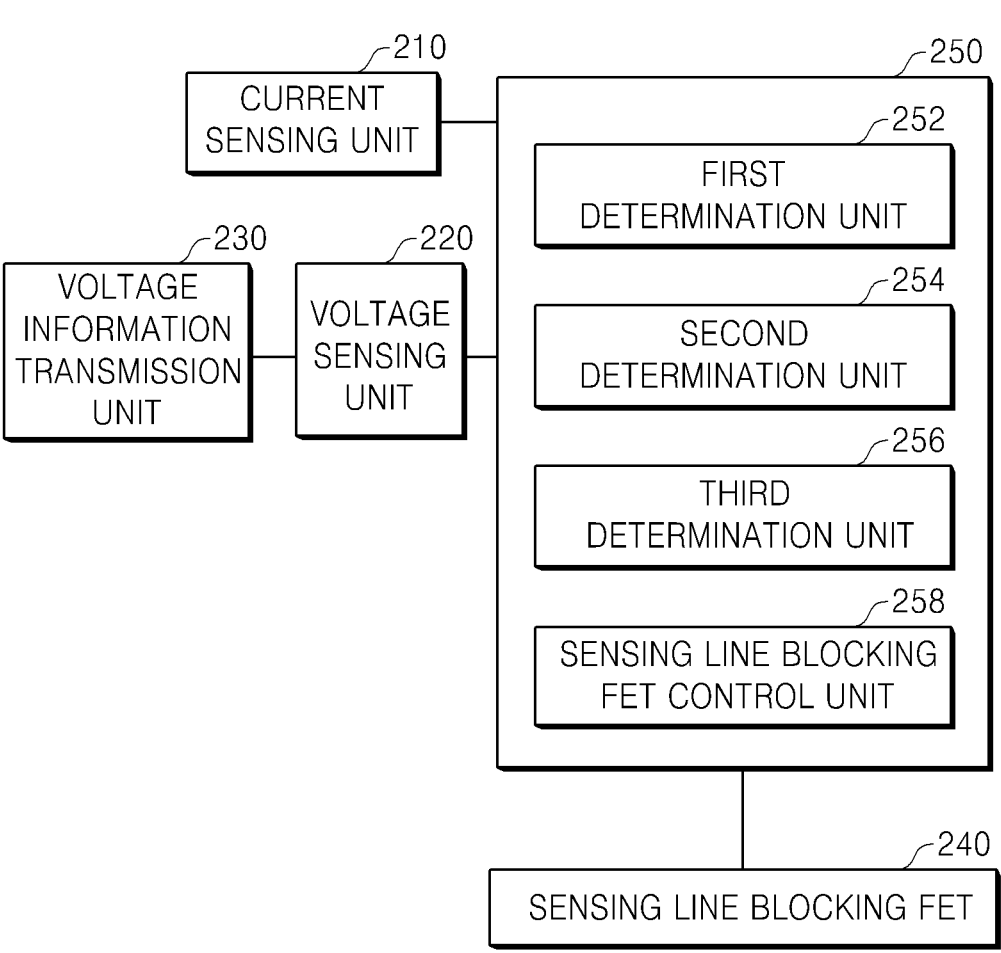
FIG. 3 is a block diagram showing a detailed configuration of a battery protection circuit according to the present invention.

Meanwhile, although only one battery cell 100 is illustrated in FIG. 2, the present invention is not limited thereto, and there may be more than one battery cell.

1.2. Voltage Sensing Line L2

The voltage sensing line is a configuration for sensing the voltage of the battery cell 100, and is connected to both ends of the battery cell 100 as shown in FIG. 2, and the voltage sensing line L2 connected to the negative portion of the battery cell 100 may be connected in parallel to the current output path L1.

This voltage sensing line is a general configuration configured in the battery protection circuit to sense the voltage of the battery cell 100, and unlike conventional voltage sensing lines, the voltage sensing line of the present invention is different in that the field effect transistor (FET) 240 that disconnects the voltage sensing line is placed in the middle.

Figure 1:
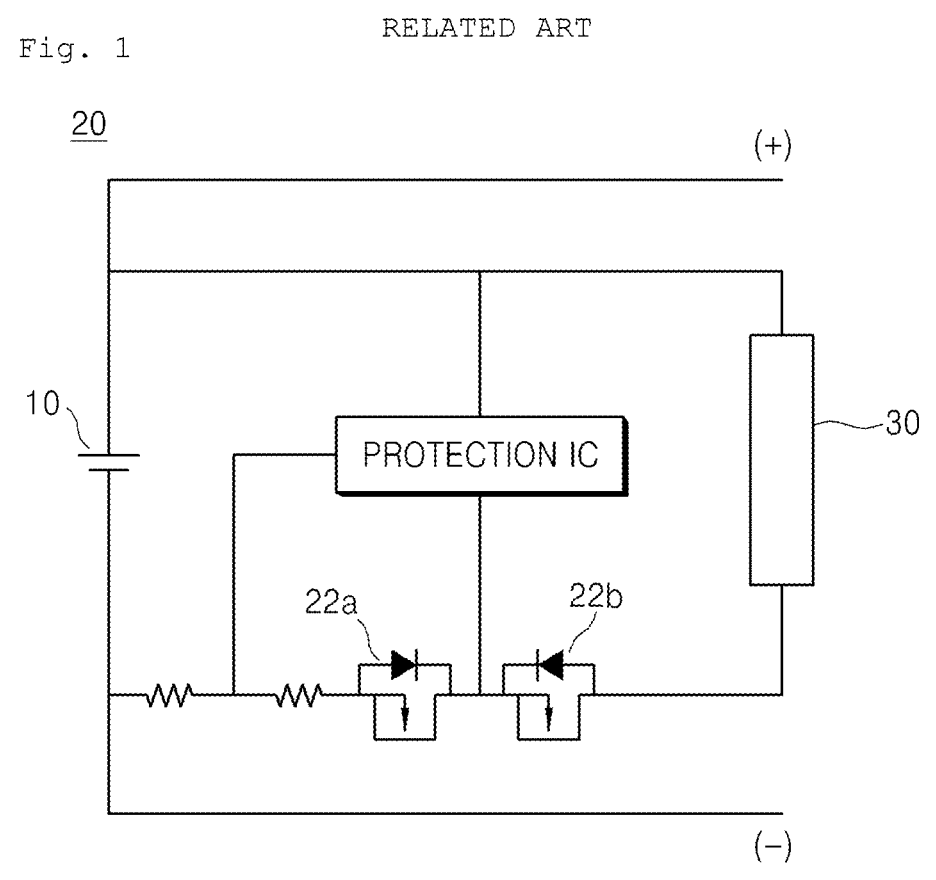

More specifically, in the case of the conventional battery protection circuit shown in FIG. 1 as described above, since it is a method of blocking the abnormal current of the battery by connecting the charge/discharge FETs 22a and 22b on the current output path from the battery cell 10 to the external system, due to the fact that the charge/discharge FETs 22a and 22b must be configured as low-resistance FETs, there are problems in that the price and size of the protection circuit increase and the internal resistance of the battery pack increases. In contrast, the present invention is to solve the above-mentioned problems by connecting the FET 240 to the voltage sensing line L2 instead of connecting the charge/discharge FET to the current output path L1. The principle will be described in detail when the control unit 250 is described below.

1.3. Current Sensing Unit 210

The current sensing unit is a configuration that is connected in series on the current output path L1 to sense the current of the battery cell 100 flowing in the path, and may include, for example, a shunt resistor. The shunt resistor is a resistor for measuring current having a very low resistance value and high precision, and measures the current by using a voltage applied to the resistor generated according to the magnitude of the current.

1.4. Voltage Sensing Unit 220

The voltage sensing unit is a configuration that is connected to both ends of the battery cell 100 through the voltage sensing line L2 to sense the voltage of the battery cell 100. The voltage sensing unit may sense the voltage of the battery cell 100 at a predetermined cycle interval.

Here, since the voltage sensing unit senses the voltage at the rear end of the sensing line blocking FET 240 provided on the voltage sensing line L2, when the sensing line blocking FET 240 provided on the voltage sensing line L2 is controlled to be off and the line L2 is disconnected, the voltage value of the battery cell 100 sensed by the voltage sensing unit becomes 0V.

1.5. Voltage Information Transmission Unit 230

The voltage information transmission unit is a configuration that transmits the voltage value of the battery cell 100 sensed by the voltage sensing unit 220 to an external system, and this may transmit the voltage value of the battery cell to an external system through a connector of the battery pack.

1.6. Sensing Line Blocking FET 240

The sensing line blocking FET is a configuration that is provided on the voltage sensing line L2 to disconnect the voltage sensing line L2 under the control of the control unit 250 to be described later. When the sensing line blocking FET is turned on in a normal state in which abnormal conditions including overcharge, overdischarge and overcurrent do not occur in the battery cell 100, but the above abnormal situation occurs, it is switched to an off state to disconnect the voltage sensing line L2. In this case, the voltage sensing unit 220 that senses the voltage of the battery cell through the voltage sensing line L2 senses the voltage of the battery cell as 0V.

1.7. Control Unit 250

The control unit is a configuration that uses the sensing values of the current sensing unit 210 and the voltage sensing unit 220 to determine whether an abnormal situation including overcharge, overdischarge and overcurrent occurs in the battery cell, and disconnects the voltage sensing line L2 by turning off the sensing line blocking FET 240 according to the determination result. Such a control unit may be configured to include the following detailed configuration.

A. First Determination Unit 252

The first determination unit may compare whether the voltage value sensed by the voltage sensing unit 220 is equal to or greater than a predetermined first reference value, and when the voltage value is equal to or greater than a predetermined first reference value, the first determination unit may determine that the current battery cell 100 is in an overcharge state. In this case, an overcharge signal indicating an overcharge state of the battery cell 100 may be output.

Here, the predetermined first reference value means an over voltage protection (OVP) value, which is a reference voltage value that is set to cut off in advance to protect the battery cell from overcharging.

B. Second Determination Unit 254

The second determination unit may compare whether the voltage value sensed by the voltage sensing unit 220 is equal to or less than a predetermined second reference value, and when the voltage value is equal to or less than a predetermined second reference value, the second determination unit may determine that the current battery cell 100 is in an overdischarge state. In this case, an overdischarge signal indicating an overdischarge state of the battery cell 100 may be output.

Here, the predetermined second reference value means a under voltage protection (UVP) value, which is a reference voltage value that is set to block in advance in order to protect the battery cell from over-discharge.

C. Third Determination Unit 256

The third determination unit may compare whether the current value sensed by the current sensing unit 210 is equal to or greater than a predetermined third reference value, and when equal to or greater than the current value, the third determination unit determines that the current battery cell 100 is in an overcurrent state. In this case, the overcurrent signal indicating the overcurrent state of the battery cell 100 may be output.

Here, the predetermined third reference value means an over current protection (OCP) value, which is a reference current value that is set to cut off in advance to protect the battery cells from overcurrent.

D. Sensing Line Blocking FET Control Unit 258

When any one of the overcharge, overdischarge and overcurrent signals are output from the first, second and third determination units 252, 254, and 256, the sensing line blocking FET control unit may recognize that an abnormal situation occurs in the current battery cell 100, and cut off the abnormal current of the battery cell by disconnecting the voltage sensing line L2 by turning off the sensing line blocking FET 240 configured in the voltage sensing line L2.

To explain the principle, when the voltage sensing line L2 is disconnected, the voltage of the battery cell sensed by the voltage sensing unit 220 becomes 0V. Then, the external system recognizes that the voltage of the current battery cell is 0V by the voltage information transmission unit 230, so that the external system's own protection circuit senses the battery's low voltage state and turns off the system power itself. Accordingly, current does not flow in the current output path L1 between the battery cell 100 and the output unit 300 of the external system, so that the abnormal current of the battery may be blocked.

In other words, in the case of a conventional battery protection circuit, compared to the method of blocking the abnormal current of the battery directly inside the protection circuit, the battery protection circuit according to the present invention is a method for transmitting a 0V voltage of a battery cell to an external system through disconnection of a voltage sensing line to block an abnormal current of a battery in the external system.

At this time, in relation to the voltage sensing path L2, because current does not flow, in order to prevent current loss and heat generation as in the past, there is no need to use a low-resistance FET, and there is no current loss and heat generation problem even with a general FET, and it is possible to protect the battery from overcharge, overdischarge, and abnormal situations including overcharge while solving the above conventional problems.

Meanwhile, the above-described voltage sensing unit 220, voltage information transmission unit 230, and control unit 250 may be implemented in a protection IC.

Figure 4:
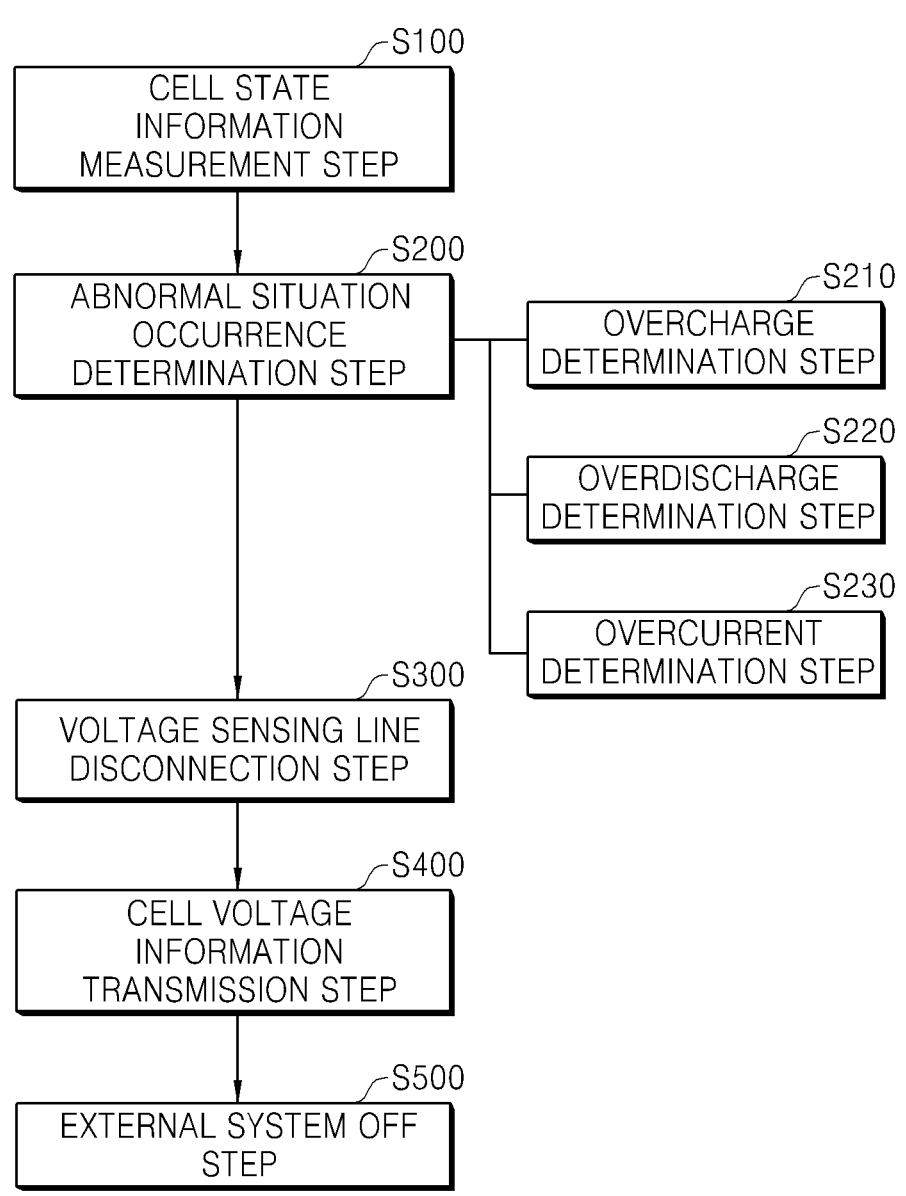
FIG. 4 is a flowchart illustrating a battery protection method using a battery protection circuit according to the present invention.

2. Battery Protection Method According to Present Invention (Refer to FIG. 4)

A method for protecting a battery from abnormal situations including overcharge, overdischarge and overcurrent by using the battery protection circuit 200 according to the present invention may include the following steps.

2.1. Cell State Information Measurement Step S100

The cell state information measurement step is a step of measuring the current and voltage values of the battery cell 100 through the sensing resistor 210 provided on the current output path L1 between the battery cell 100 and the output unit 300 to the external system and the voltage sensing line L2 connected to both ends of the battery cell 100, and may be performed at predetermined periodic intervals.

2.2. Abnormal Situation Occurrence Determination Step S200

The abnormal situation occurrence determination step is a step of determining whether an abnormal situation including overcharge, overdischarge, and overcurrent occurs in the battery cell using the current and voltage values of the battery cells measured in the cell state information measurement step S100.

A. Overcharge Determination Step S210

The overcharge determination step may compare whether the voltage value of the battery cell measured in the cell state information measurement step S100 is equal to or greater than a predetermined first reference value, and when the voltage value is greater than or equal to the first reference value, the overcharge determination step determines that the battery cell is in an overcharge state (first determination unit 252).

B. Overdischarge Determination Step S220

The overdischarge determination step compares whether the voltage value of the battery cell measured in the cell state information measurement step (S100) is equal to or less than a predetermined second reference value, and when the voltage value is equal to or less than a predetermined second reference value, the overdischarge determination step may determine that the battery cell is in an overdischarge state (second determination unit 254).

C. Overcurrent Determination Step S230

The overcurrent determination step may compare whether the voltage value of the battery cell measured in the cell state information measurement step S100 is equal to or greater than a predetermined third reference value, and when the voltage value is greater than or equal to the third reference value, the overcurrent determination step determines that the battery cell is in an overcurrent state (third determination unit 256).

The abnormal situation occurrence determination step may determine that an abnormal situation occurs in the battery cell if any one of the overcharge, overdischarge and overcurrent states of the battery cell is determined through the overcharge determination step S210, overdischarge determination step S220, and overcurrent determination step S230.

2.3. Voltage Sensing Line Disconnection Step S300

The voltage sensing line disconnection step may disconnect the voltage sensing line when it is determined that the battery cell corresponds to any one of an overcharge, an overdischarge, and an overcurrent state in the abnormal situation occurrence determination step S200. Disconnecting the voltage sensing line consists of turning off the sensing line blocking FET 240 configured on the voltage sensing line L2 connected to both ends of the battery cell. This step is performed by the blocking FET control unit 258 of the control unit 250 described above.

2.4. Cell Voltage Information Transmission Step S400

The cell voltage information transmission step is a step of transmitting the voltage value of the battery cell measured through the voltage sensing line disconnected by the voltage sensing line disconnection step S300 to an external system (voltage information transmission unit 230). Through these steps, the external system may recognize the voltage state of the battery cell.

At this time, the voltage value of the battery cell transmitted to the external system in this step is 0V because it is a value measured through the disconnected voltage sensing line.

2.5. External System Off Step S500

The external system off step is a step of automatically turning off the system power by sensing the current battery cell as being in a low voltage state as the voltage value, that is, the 0V value, of the battery cell measured through the voltage sensing line disconnected by the cell voltage information transmission step S400 is received from an external system. Accordingly, the charge/discharge current does not flow between the battery cell 100 and the external system, resulting in blocking the abnormal current of the battery corresponding to the abnormal situation.

As such, by connecting the FET on the voltage sensing line without configuring the charge/discharge FET in the current output path between the battery cell and the external system, when an abnormal situation of a battery occurs, as the external system recognizes the battery as a low voltage state and turns off the power by itself by disconnecting the voltage sensing line, it is possible to cut off the abnormal current of the battery.

On the other hand, although the technical idea of the present invention has been specifically described according to the above embodiment, it should be noted that the above embodiments are for the purpose of explanation and not limitation. In addition, those skilled in the art in the technical field of the present invention will be able to understand that various embodiments are possible within the scope of the spirit of the present invention.

The invention claimed is:

1. A battery protection circuit for protecting a battery cell from abnormal situations including overcharge, overdischarge and overcurrent, the battery protection circuit comprising:

a current sensing unit connected in series on a current output path formed between one terminal of the battery cell and an output unit to an external system, and configured to sense a current of the battery cell flowing in the current output path;

a voltage sensing unit connected to a voltage sensing line connected to both ends of the battery cell, the voltage sensing unit being configured to sense a voltage of the battery cell;

a voltage information transmission unit configured to transmit the voltage of the battery cell sensed by the voltage sensing unit to the external system;

a control unit configured to:
  determine whether an abnormal situation occurs in the battery cell using the current sensed by the current sensing unit and the voltage sensed by the voltage sensing unit, and
  disconnect the voltage sensing line according to the determination result; and a sensing line blocking field effect transistor (FET) provided on the voltage sensing line and configured to be turned off under control of the control unit to disconnect the voltage sensing line, wherein the control unit is configured to determine whether the battery cell has an abnormal situation by comparing the voltage of the battery cell to a predetermined first reference value and a predetermined second reference value different than the predetermined first reference value and by comparing the current of the battery cell measured by the current sensing unit to a predetermined third reference value different than the predetermined first reference value and the predetermined second reference value, wherein the predetermined third reference value is an over current protection (OCP) value that is set lower than an overcurrent current, and wherein when the voltage information transmission unit transmits 0 volts (V) voltage of the battery cell to the external system after the voltage sensing line is disconnected, the external system senses that the battery cell is in a low voltage state and turns off system power of the external system.

2. The battery protection circuit of claim 1, wherein the control unit comprises:

a first determination unit configured to:

compare whether the voltage of the battery cell sensed by the voltage sensing unit is equal to or greater than the predetermined first reference value, and determine that the battery cell is in an overcharge state and output an overcharge signal when the voltage of the battery cell is greater than or equal to the predetermined first reference value;

a second determination unit configured to:

compare whether the voltage of the battery cell sensed by the voltage sensing unit is less than or equal to the predetermined second reference value, and determine that the battery cell is in an over-discharge state and output an overdischarge signal when the voltage of the battery cell is less than or equal to the predetermined second reference value;

a third determination unit configured to:

compare whether the current of the battery cell sensed by the current sensing unit is equal to or greater than the predetermined third reference value, and determine that the battery cell is in an overcurrent state and output an overcurrent signal when the current of the battery cell is equal to or greater than the predetermined third reference value; and a blocking FET control unit configured to disconnect the voltage sensing line by turning off the sensing line blocking FET when any one of the overcharge signal, the overdischarge signal and the overcurrent signal is output by a respective one of the first determination unit, the second determination unit and the third determination unit.

3. The battery protection circuit of claim 2, wherein when the voltage sensing line is disconnected by the blocking FET control unit, the voltage of the battery cell sensed by the voltage sensing unit is 0 volts (V).

4. A battery pack comprising the battery protection circuit according to claim 1.

5. The battery protection circuit of claim 1, wherein the predetermined first reference value is an over voltage protection (OVP) value that is set lower than an overcharging voltage.

6. The battery protection circuit of claim 1, wherein the predetermined second reference value is an under voltage protection (UVP) value that is set higher than an over-discharging voltage.

7. A method of protecting a battery cell from abnormal situations including overcharge, overdischarge and overcurrent, the method comprising:

a cell state information measurement step of measuring a current and a voltage of the battery cell at predetermined periodic intervals through a sensing resistor provided on a current output path between the battery cell and an output unit to an external system and a voltage sensing unit connected to a voltage sensing line connected to both ends of the battery cell;

an abnormal situation occurrence determination step of determining whether an abnormal situation occurs in the battery cell using the current and the voltage of the battery cell measured in the cell state information measurement step;

a voltage sensing line disconnection step of disconnecting the voltage sensing line when it is determined that the abnormal situation occurs in the battery cell by the abnormal situation occurrence determination step;

a cell voltage information transmission step of transmitting the voltage of the battery cell measured by the voltage sensing unit when the voltage sensing line is disconnected by the voltage sensing line disconnection step to the external system; and an external system power off step of automatically turning off system power in the external system receiving the voltage of the battery cell measured by the voltage sensing unit during the cell voltage information transmission step, wherein the abnormal situation occurrence determination step comprises comparing the voltage of the battery cell to a predetermined first reference value and a predetermined second reference value different than the predetermined first reference value and comparing the current of the battery cell measured by the sensing resistor to a predetermined third reference value different than the predetermined first reference value and the predetermined second reference value, wherein the predetermined third reference value is an over current protection (OCP) value that is set lower than an overcurrent current, and wherein the external system power off step senses that the current of the battery cell is in a low voltage state and turns off the system power when 0 volts (V) voltage of the battery cell is transmitted by the cell voltage information transmission step in the external system.

8. The method of claim 7, wherein the abnormal situation occurrence determination step further comprises:

an overcharge determination step of comparing whether the voltage of the battery cell measured in the cell state information measurement step is equal to or greater than the predetermined first reference value, and determining that the battery cell is in an overcharge state when the voltage of the battery cell is equal to or greater than the predetermined first reference value;

an overdischarge determination step of comparing whether the voltage of the battery cell measured in the cell state information measurement step is less than or equal to the predetermined second reference value, and determining that the battery cell is in an overdischarge state when the voltage of the battery cell is less than or equal to the predetermined second reference value; and an overcurrent determination step of comparing whether the current of the battery cell measured in the cell state information measurement step is equal to or greater than the predetermined third reference value, and determining that the battery cell is in an overcurrent state when the current of the battery cell is equal to or greater than the predetermined third reference value, and wherein when any one of the overcharge, the overdischarge and the overcurrent is determined, it is determined that the abnormal situation occurs in the battery cell.

9. The method of claim 7, wherein the voltage sensing line disconnection step comprises turning off a sensing line blocking field effect transistor (FET) disposed on the voltage sensing line.

10. The method of claim 7, wherein in the cell voltage information transmission step, the voltage of the battery cell transmitted to the external system is 0 volts (V).

\* \* \* \* \*